US012543008B2

(12) United States Patent
Beuchert et al.

(10) Patent No.: US 12,543,008 B2
(45) Date of Patent: Feb. 3, 2026

(54) AUTOMATICALLY INFORMING A USER ABOUT A CURRENT HEARING BENEFIT WITH A HEARING DEVICE

(71) Applicant: Sonova AG, Stäfa (CH)

(72) Inventors: Marius Beuchert, Mosbach (DE); Michael Boretzki, uml u+ee ti (CH)

(73) Assignee: Sonova AG, Stäfa (CH)

( * ) Notice: Subject to any disclaimer, the term of this patent is extended or adjusted under 35 U.S.C. 154(b) by 118 days.

(21) Appl. No.: 18/598,244

(22) Filed: Mar. 7, 2024

(65) Prior Publication Data

US 2024/0305934 A1 Sep. 12, 2024

(30) Foreign Application Priority Data

Mar. 8, 2023 (EP) .................................... 23160641

(51) Int. Cl.
*H04R 25/00* (2006.01)

(52) U.S. Cl.
CPC .................................... *H04R 25/30* (2013.01)

(58) Field of Classification Search
CPC ...................................................... H04R 25/30
USPC ........................................................... 381/60
See application file for complete search history.

(56) References Cited

U.S. PATENT DOCUMENTS

| | | | |
|---|---|---|---|
| 5,645,074 | A | 7/1997 | Shennib et al. |
| 5,825,894 | A | 10/1998 | Shennib |
| 5,923,764 | A | 7/1999 | Shennib |
| 6,167,138 | A | 12/2000 | Shennib |
| 8,948,428 | B2 | 2/2015 | Kates |
| 10,231,069 | B2 | 3/2019 | Roeck et al. |
| 10,674,285 | B2 | 6/2020 | Walsh et al. |
| 2014/0300466 | A1 | 10/2014 | Park et al. |

(Continued)

FOREIGN PATENT DOCUMENTS

| | | | |
|---|---|---|---|
| CN | 1260104 | A | 7/2000 |
| EP | 0868830 | A1 | 10/1998 |

(Continued)

OTHER PUBLICATIONS

The European Search Report issued in corresponding European Patent Application No. 23160641.9; Dated: Aug. 7, 2023.

(Continued)

*Primary Examiner* — Phylesha Dabney
(74) *Attorney, Agent, or Firm* — McDonald Hopkins LLC

(57) ABSTRACT

A method informs a user of a hearing device about a current hearing benefit with the hearing device. The method is performed by a hearing system including the hearing device, which is worn by the user. The method includes: acquiring a sound signal with a microphone of the hearing device, processing the acquired sound signal with the hearing device via a current audio processing profile and outputting the processed sound signal to the user; detecting a presence of a acoustic object in the sound signal; when the presence of a acoustic object is detected, estimating a current perception magnitude value for the current audio processing profile and a corresponding reference perception magnitude value for a reference audio processing profile; and notifying the user with a message, when a deviation between the current perception magnitude value and the reference perception magnitude value exceeds a threshold.

15 Claims, 1 Drawing Sheet

(56) References Cited

U.S. PATENT DOCUMENTS

| | | | | |
|---|---|---|---|---|
| 2017/0127201 | A1 | 5/2017 | Roeck et al. | |
| 2021/0329391 | A1* | 10/2021 | Asnes .................. | H04R 25/505 |
| 2022/0180767 | A1 | 6/2022 | Aharonson et al. | |
| 2023/0037356 | A1 | 2/2023 | Pontoppidan et al. | |

FOREIGN PATENT DOCUMENTS

| | | | | |
|---|---|---|---|---|
| EP | 0923342 | A1 | 6/1999 | |
| EP | 3155827 | A1 | 4/2017 | |
| WO | 9723117 | A1 | 6/1997 | |
| WO | 9806330 | A1 | 2/1998 | |
| WO | WO-2015192870 | A1 * | 12/2015 | ............. H04R 25/70 |

OTHER PUBLICATIONS

The European Search Report issued in corresponding European Patent Application No. 24158791.4; Mailed: Mar. 20, 2024.

* cited by examiner

AUTOMATICALLY INFORMING A USER ABOUT A CURRENT HEARING BENEFIT WITH A HEARING DEVICE

FIELD OF THE INVENTION

The invention relates to a method and a computer program for informing a user of a hearing device about a current hearing benefit with the hearing device. Furthermore, the invention relates to a hearing system with a hearing device and optionally a mobile device.

BACKGROUND OF THE INVENTION

Hearing devices are generally small and complex devices. Hearing devices can include a processor, microphone, speaker, memory, housing, and other electronical and mechanical components. Some example hearing devices are Behind-The-Ear (BTE), Receiver-In-Canal (RIC), In-The-Ear (ITE), Completely-In-Canal (CIC), and Invisible-In-The-Canal (IIC) devices. A user can prefer one of these hearing devices compared to another device based on hearing loss, aesthetic preferences, lifestyle needs, and budget.

First time hearing device users, in particular, when the hearing loss is mild to moderate, have a difficulty of experiencing the benefit of aided hearing. One reason is that being aided, they cannot easily imagine how they would hear unaided and vice versa. The reason for the latter is the limited capability of auditory memory and our limited ability to precisely judge the ease or difficulty of listening situations, which themselves are variable.

Usually, persons cannot directly compare auditory experiences which are temporally far from each other. The variability of real-life listening situations is a challenge for comparing aided and unaided hearing. Another reason is that mild to moderate hearing loss users do not get equal benefit of aided hearing in all situations. In some situations, the benefit is exceedingly small or even non-existent, in others it is large. First time users do not know well in which situations they are helped well by aided hearing.

A typical soundscape has multiple sound sources and respective perception opportunities and again first time users do not know the perception of which of them is especially improved by aided hearing. Also, first-time users may not clearly know that the key disadvantage of hearing loss is reduced detection, distinction, recognition, localization and understanding of sounds.

WO 2015/192870 A1 and U.S. Pat. No. 10,231,069 B2 describe a method for evaluating a hearing benefit of a hearing device feature. During the method, a classifier classifies a hearing situation and dependent on the hearing situation selects a feature of the hearing device, which is activated. The hearing device user is then able to compare the activated feature with another feature, which has been active before.

BRIEF SUMMARY OF THE INVENTION

It is an objective of the invention to simplify and improve the habituation process of a user to a hearing device. A further objective of the invention is to help the user to identify benefits, the user has with the hearing device.

These objectives are achieved by the subject-matter of the independent claims. Further exemplary embodiments are evident from the dependent claims and the following description.

A first aspect of the invention relates to a method for informing a user of a hearing device about a current hearing benefit with the hearing device, the method being performed by a hearing system comprising the hearing device, which is worn by the user, for example behind the ear and/or in the ear. The hearing system also may comprise a mobile device, such as a smartphone, which is in data communication with the hearing device. Some of the method steps described below may be performed by the mobile device.

According to the invention, the method comprises: acquiring a sound signal with a microphone of the hearing device, processing the acquired sound signal with the hearing device via a current audio processing profile and outputting the processed sound signal to the user. The current audio processing profile may comprise processing features and/or hearing programs, which process the sound signal. The processing features and/or hearing programs may control a sound processor of the hearing device and/or may be a part of the sound processor, which may be a digital signal processor. The selection and/or parameters of the processing features and/or hearing programs may depend on features of the sound signal and/or a classification of the sound signal, which also may be determined by the hearing system, i.e. the hearing device and/or the mobile device.

The processed sound may be output to the user via a loudspeaker or a cochlear implant.

According to the invention, the method further comprises: detecting a presence of an acoustic object in the sound signal, in particular by classifying the sound signal. An acoustic object may be a feature of the sound signal. In general, an acoustic object is a feature of the sound signal detectable by evaluating the sound signal with the hearing device. The hearing device may comprise classifiers, which are adapted for determining, whether acoustic objects are present in the sound signal or not. The presence of an acoustic object may be indicated by an output of a classifier. For example, a acoustic object may be a specific type of sound in the sound signal, such as noise, spoken language or music. An acoustic object may be a sound object. An acoustic object also may be a characteristic of the sound signal, such as loud and calm.

According to the invention, the method further comprises: when the presence of a acoustic object is detected, estimating at least one current perception magnitude value for the current audio processing profile and a corresponding reference perception magnitude value for a reference audio processing profile. The current perception magnitude value is indicative of a magnitude of perception of the acoustic object by the user in the processed sound signal. The perception magnitude value may be a value, which indicates, how good and/or how intense the user is able to perceive the acoustic object in a sound signal, which would be output to him by the hearing device.

For example, this sound signal may be the processed sound signal, the acquired sound signal or the sound signal processed with the reference audio processing profile.

It is not necessary that the perception magnitude value is determined from the processed sound signal. It may be that the perception magnitude value is determined from the acquired sound signal and/or the detected acoustic object based on the selected processing features and/or parameters of the corresponding audio processing profile, which would result in the processed audio signal.

The current perception magnitude value and the reference perception magnitude value refer to a magnitude of detectability, recognizability, localizability and/or intelligibility of the acoustic object by the user. The perception magnitude value may refer to an attribute of sound perception, which may comprise detectability, recognizability, localizability and/or intelligibility of the acoustic object. The perception magnitude value may be determined also based on hearing characteristics of the user, such as an audiogram of the user.

The reference perception magnitude value is indicative of a perception by the user of the acoustic object in the acquired unprocessed and/or unmodified sound signal or the acquired sound signal being processed with the reference audio processing profile. It may be that the reference audio processing profile is the profile without processing the acquired sound signal.

In general, the current perception magnitude value may refer to an aided processing profile, which is a processing profile defined by a number of processing features. The reference perception magnitude value may refer to an unaided processing profile, which is another processing profile lacking at least one of the processing features of the aided processing profile.

Unaided, in general, does not mean the raw or acquired signal. For example, if amplification is switched off, a user cannot hear any benefit for other features as he simply cannot hear at all anymore. So, in order to experience benefit of for example improved speech intelligibility by beamforming, the amplification needs to be present in both, the current and reference processing profile, whereas the beamformer can be switched on and off. Unaided also may corresponds to acoustic transparency. Acoustic transparency may require at least acoustic coupling compensation at the input and at the output side of the hearing device. This may mean compensating the spectral and overall sensitivities of the input stage (such as the microphone) and the output stage (such as the receiver, loudspeaker, electrodes,) of the sound processing system of the hearing device. Another way of expressing acoustic transparency is by requiring that the "insertion gain" is zero at all frequencies. The insertion gain is calculated by the quotient of a transfer function from a sound pressure level free field (sound pressure level measured with sound level meter at the place where the head of the human would be, but without the human being there) to a real ear sound pressure level (sound pressure level measured in front of the ear drum with a probe tube microphone) with the hearing device being inserted and active and the transfer function between free field and real ear without a hearing device being inserted.

According to the invention, the method further comprises: initiating an action for informing the user, when a deviation between the estimated current perception magnitude value and the estimated reference perception magnitude value exceeds a corresponding predefined threshold. A hearing benefit may be present, when there is a large deviation between the current perception magnitude value and the reference perception magnitude value. The action may be a notification of the user and/or a switching to the reference audio processing profile with the hearing device. The deviation may be determined by an adequate metric. The predefined threshold may provide a minimum deviation for this metric. The predefined threshold may be a value set in the hearing device.

According to the invention, the method further comprises: notifying the user with a message about the current hearing benefit when a deviation between the estimated current perception magnitude value and the estimated reference perception magnitude value exceeds a corresponding predefined threshold. The message may be a sound message and/or a visual message provided by the hearing system. The notification may be done via the hearing device, for example with a sound message. The notification also may be done via the mobile device, which for example may show a corresponding message.

According to an embodiment of the invention, the method further comprises: providing the user a user interface to switch to the reference audio processing profile, when the deviation exceeds the threshold. Such a user interface may be provided by the mobile device. The user then may select to switch to the reference audio processing profile.

According to an embodiment of the invention, the method further comprises: switching to the reference audio processing profile, when the deviation exceeds the threshold. This switching may be done upon selection of the user or automatically by the hearing system.

According to an embodiment of the invention, the presence of the acoustic object is detected with a machine learning algorithm into which the sound signal is input and which has been trained to classify, whether an acoustic object of a plurality of acoustic objects is present in the sound signal. For example, the machine learning algorithm may be an artificial neuronal network, which has been trained to classify a number of different acoustic objects.

According to an embodiment of the invention, features of a hearing performance of the user for estimating the at least one current perception magnitude value and the reference perception magnitude value. The hearing performance of the user may comprise features such as one or more audiograms of the user, and/or results of a test of the user with respect to word recognition ability word discrimination ability, etc.

According to an embodiment of the invention, the at least one current perception magnitude value and reference perception magnitude value are estimated by evaluating the sound signal processed by the current audio processing profile and/or the sound signal processed with the reference audio processing profile (which may be the unprocessed acquired sound signal). For example, the perception magnitude value may be a value output by a programmed algorithm and/or machine learning algorithm, into which the corresponding sound signal is input.

According to an embodiment of the invention, for estimating the respective perception magnitude value, features of the respective sound signal are compared with features of the hearing performance of the user.

According to an embodiment of the invention, the at least one current perception magnitude value and reference perception magnitude value are determined by evaluating frequency bands of the respective sound signal. The respective sound signal is transformed into the frequency domain and is divided into a set of frequency bands. This may be done with a third octave filter bank, which divides the sound signal into frequency bands, which have the width of a third octave.

According to an embodiment of the invention, an average and/or maximal amplitude in each frequency band is determined. This may be seen as level of the sound signal in this frequency band.

According to an embodiment of the invention, a frequency dependent perception magnitude value is determined for each frequency band and an overall perception magnitude value is determined by weighting the frequency dependent perception magnitude values. The perception magnitude value may be calculated by weighting the levels in the frequency bands with frequency dependent attribute factors (i.e. weights) and summing them. For example, for loudness and/or sharpness as attributes, factors for a frequency dependent loudness and/or sharpness sensation may be used as attribute factors.

According to an embodiment of the invention, the method further comprises: extracting one or more acoustic object signals from the respective sound signal and determining the at least one current perception magnitude value and reference perception magnitude value from the acoustic object signals. The evaluation above may also be performed for specific acoustic objects, such as speech, bird's twitter, etc. The extraction of the acoustic object signals may be done by the same component, which also detects the corresponding acoustic objects.

According to an embodiment of the invention, the at least one current perception magnitude value and reference perception magnitude value comprise a current detectability value and a reference detectability value, i.e. the attribute is detectability.

A detectability value of a sound signal may be determined by comparing spectral values of the sound signal with frequency specific hearing thresholds of the user.

A detectability value of a sound signal may be determined by calculating an overall loudness of the sound signal.

A detectability value of a sound signal may be determined by calculating spectral sensation levels above frequency specific hearing thresholds of the user.

Frequency specific hearing thresholds of the user may have been determined by testing when a user starts to hear a testing sound signal at the respective frequency. Levels of the sound signal in the frequency bands may be determined, such as an average and/or maximal amplitude of the sound signal in the respective frequency band. A spectral sensation level in a frequency band may be the difference of the user hearing threshold in the frequency band and the level of the sound signal in that frequency band. The user hearing threshold in a frequency band may have been determined for the user in a corresponding hearing test.

As already mentioned, the perception magnitude value refers to a magnitude of detectability, recognizability, localizability and/or intelligibility of the acoustic object, such as perceived by the user. In general, detectability, recognizability, localizability and/or intelligibility may be seen as attributes of sound perception of the user and the perception magnitude value is an indicator how strong and/or intense the user is able to perceive the corresponding attribute.

According to an embodiment of the invention, the at least one current perception magnitude value and reference perception magnitude value comprise a current intelligibility value and a reference intelligibility value, i.e. the attribute is intelligibility.

An intelligibility value of a sound signal may be determined by extracting a speech signal from the sound signal.

For determining the intelligibility value, a speech signal may be extracted from the sound signal. Speech may be considered as a specific acoustic object. The speech signal may be divided into frequency bands and a speech level of the speech signal in each of the bands may be determined, these levels may be compared to frequency dependent hearing thresholds. The frequency dependent hearing threshold may have been determined for the user based on a hearing threshold test performed with the user.

An intelligibility value of a sound signal also may be determined by calculating a signal to noise ratio of the sound signal.

As a further example, the intelligibility value may be or may be depend on a speech intelligibility index. The speech intelligibility index (SII) was developed to predict the intelligibility of the speech signal by weighting the importance of different frequency regions of audibility for a given speech test. To obtain the SII, the frequency spectrum between 100 and 9500 Hertz is divided into frequency bands, either by octaves, ⅓ octaves, or critical bands. The product of the audibility function and the frequency band importance function for each frequency band are calculated and summed to calculate the SII.

The audibility function represents the proportion of the speech signal audible within each frequency band. A fully audible signal in a frequency band has a value of 1. The value of the audibility function will decrease with signal attenuation, the presence of a masking noise, or the presence of hearing loss. The presence of hearing loss affects the SII in two ways: First, the hearing loss attenuates the signal, making it less audible, and second, the SII incorporates a distortion factor when hearing loss is more severe to reflect the decreased clarity of speech experienced by individuals with sensorineural hearing loss. The value of the audibility function will increase with the presence of signal amplification, either through raising vocal intensity or with hearing aids, but will never exceed 1 in any frequency band.

The frequency band importance function denotes the contribution of each frequency band to the intelligibility of speech. Each frequency band is assigned a value less than 1, and the sum of the values of all frequency bands is equal to 1. Frequency band importance functions may vary depending on numerous variables, including the speech spectrum of the speaker, the language, and the phonemic content of the stimuli.

According to an embodiment of the invention, the at least one current perception magnitude value and reference perception magnitude value comprise a current recognizability value and a reference recognizability value, i.e. the attribute is recognizability.

A recognizability value of a sound signal may depend on acoustic object signals extracted from the sound signal. For a number of acoustic objects, a acoustic object signal may be extracted, this may be done for some or all or specific acoustic objects as detected in the sound signal. The one or more acoustic object signals may be analyzed and compared to user thresholds, such as described above, to determine an perception magnitude value for the one or more the acoustic object signals, which may be called recognizability value.

According to an embodiment of the invention, the at least one current perception magnitude value and reference perception magnitude value comprise a current localizability value and a reference localizability value, i.e. the attribute is localizability.

A localizability value of a sound signal is determined by evaluating frequencies of the sound signals higher than a frequency threshold and/or an activity of beamformers of the hearing device.

Since localizability of acoustic objects is easier for acoustic objects with higher frequencies, solely frequency bands with frequencies of the sound signals higher than a frequency threshold may be evaluated. For example, the localizability value may be a weighted sum of sound levels of these frequency bands.

The localizability value also may depend on an activity of beamformers. When beamformers are used, the localizability value is decreased. Active beamformers may decrease the localizability of acoustic objects. Beamformers may be used solely for analysis of the soundscape but not for processing sound. Beamformers may be used to determine if a sound is coming from a definite direction or if sound immission to the hearing is diffuse. The less diffuse sound immission is the more localizable is the sound.

According to an embodiment of the invention, the method further comprises: estimating a difficulty value of a current hearing situation by evaluating the acquired sound signal. The threshold for the deviation of the perception magnitude values may be increased, when the difficulty value increases. When the overall hearing situation becomes more difficult, such as a lot of different sounds, a noise background or quiet sound, the threshold is increased, to prevent notification of the user in difficult sound situations, where the benefit of the hearing device might be not so high.

According to an embodiment, fixed difficulty values are assigned to sound classes of the hearing device, wherein the hearing device is adapted for recognizing and/or distinguishing the sound classes by analyzing the sound signal. The difficulty value then may be determined from the fixed difficulty values and recognized sound classes, for example as an average of the fixed difficulty values of the recognized sound classes. According to an embodiment of the invention, the difficulty value depends on the number and/or types of detected acoustic objects. For example, the difficulty value increases with the number of detected acoustic objects. Also, there may be preset difficulty values for specific acoustic objects. As an example, the number of acoustic objects, which are audible to healthy ears may be estimated. The higher the number, the more complex and difficult is the soundscape, because the sound sources mask each other at least partially and reduce the recognizability of all of them.

According to an embodiment of the invention, the threshold for the deviating of the perception magnitude values is adjustable by the user with the hearing system. When the user is notified too often according to his opinion, then he may increase the threshold. This may be done with the mobile device, for example.

According to an embodiment of the invention, the method further comprises: solely when additionally a temporal change of the deviation of the perception magnitude values is smaller than a temporal change threshold, notifying the user about the current hearing benefit. The hearing system may wait for a specific time, whether the deviation stays above the corresponding threshold. Solely in this case, the hearing situation may be seen as substantially stable and the user may be notified. This may avoid hearing situations, in which the possible hearing benefit is not present any more, when the user notices the notification.

According to an embodiment of the invention, the temporal change threshold is adjustable by the user with the hearing system. Also this threshold may be tuned by the user, for example with the mobile device.

According to an embodiment of the invention, the hearing system comprises a mobile device in data communication with the hearing device. The mobile device may be a device adapted for being carried by the user, such as a smartphone, smartwatch or tablet computer.

According to an embodiment of the invention, the mobile device at least performs one of: detecting the presence of the acoustic object; estimating the at least one current perception magnitude value and reference perception magnitude value and/or the temporal change threshold; and/or notifying the user about the current hearing benefit. This may shift the computational burden of the method from the hearing device to the mobile device.

Further aspects of the invention relate to a computer program for informing a user of a hearing device about a current hearing benefit, which, when being executed by a processor, is adapted to carry out the steps of the method as described in the above and in the following as well as to a computer-readable medium, in which such a computer program is stored.

For example, the computer program may be executed in a processor of a hearing device, which hearing device, for example, may be worn by the user and/or may be carried by the user behind the ear. The computer-readable medium may be a memory of this hearing device. The computer program also may be executed by a processor of the mobile device and the computer-readable medium may be a memory of the mobile device. It also may be that steps of the method are performed by the hearing device and other steps of the method are performed by the mobile device.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. The computer-readable medium may be a non-transitory or transitory medium.

A further aspect of the invention relates to a hearing system comprising a hearing device, wherein the hearing system is adapted for performing the method as described herein. The hearing system also may comprise the mobile device.

It has to be understood that features of the method as described in the above and in the following may be features of the computer program, the computer-readable medium and the hearing system as described in the above and in the following, and vice versa.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
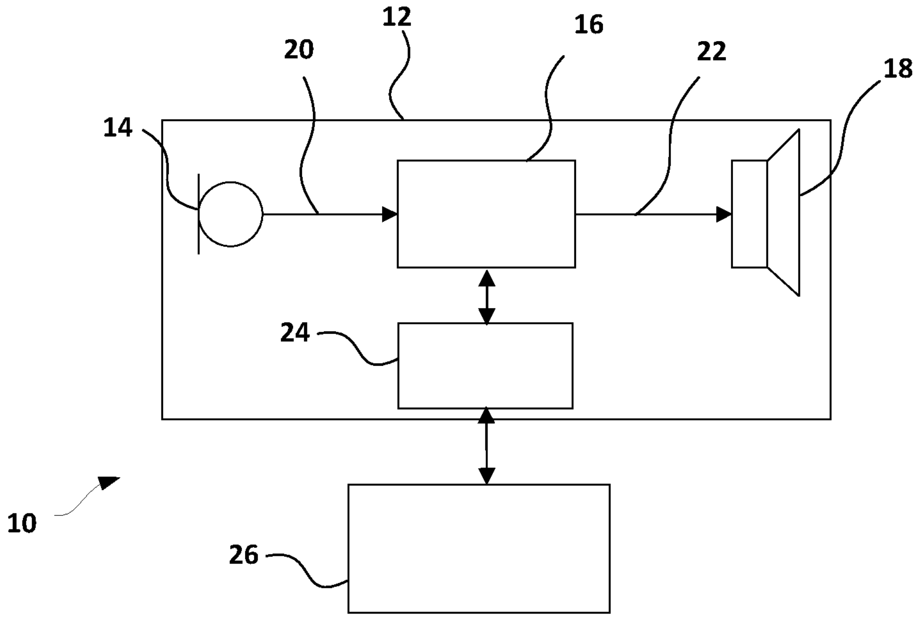
FIG. 1 schematically shows a hearing system according to an embodiment of the invention.

FIG. 1 shows a hearing system 10 with a hearing device 12, which may be carried by a user, for example in the ear and/or behind the ear.

The hearing device 12 comprises a sound input device 14, such as a microphone, a sound processor 16 and a sound output device 18, such as a loudspeaker. A sound signal 20 from the sound input device 14 is processed by the sound processor 16 into a processed sound signal 22, which is output by the user via the sound output device 18.

The hearing device 12 furthermore comprises a processor 24, which controls the sound processor 16. For example, a computer program run by the processor changes parameters of the sound processor 16, such that sound signal 20 is processed in a different way.

The hearing system 10 also may comprise a mobile device 26, which is also carried by the user and which is in data communication with the hearing device 12, for example via Bluetooth.

Figure 2:
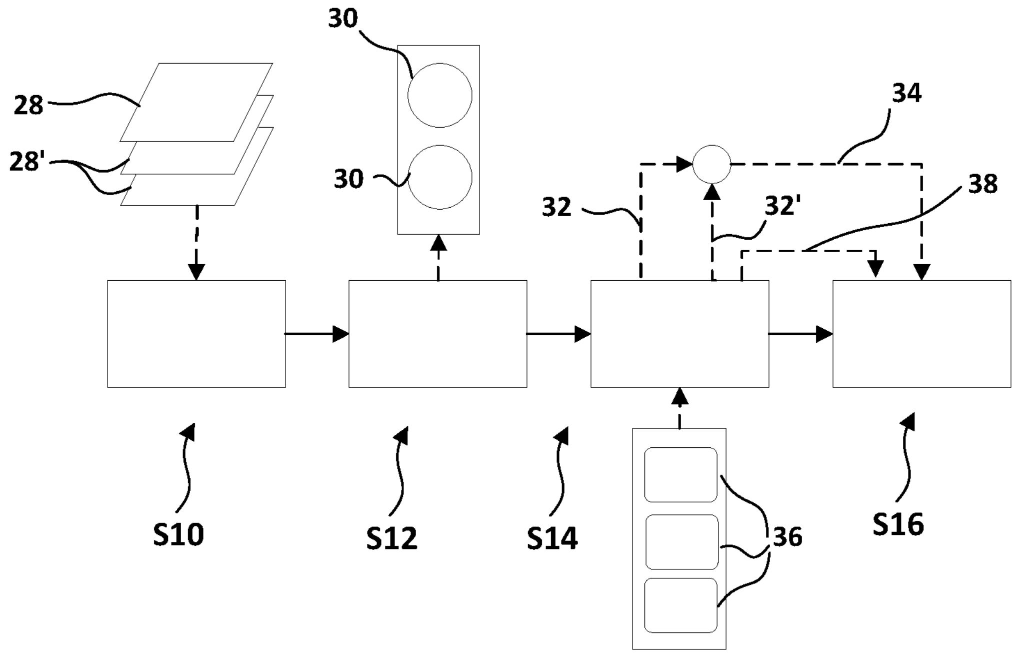
FIG. 2 shows a flow diagram for a method for informing a user of a hearing device about a current hearing benefit with the hearing device.

FIG. 2 shows a flow diagram illustrating a method for informing the user of the hearing device 12 about a current hearing benefit with the hearing device 12. The method is performed by the hearing system 10, particularly the hearing device 12 and optionally the mobile device 26.

In step S12, the microphone 14 acquires the sound signal 20 and the hearing device 12 processes the acquired sound signal 20 with the hearing device 12 via a current audio processing profile 28. The processed sound signal 22 is output to the user via the sound output device 18. An audio processing profile 28 may comprise parameters for controlling the sound processor 16. There may be more than one audio processing profile 28, which may be stored in the hearing device 12. Based on different hearing situations, other audio processing profiles 28 may be chosen. For example, the hearing device 12 may classify the current hearing situation and based thereon may choose an audio processing profile 28 associated with the classified hearing situation.

In step S14, a presence of a acoustic object 30 in the sound signal 20 is detected by the hearing system 10. Such a acoustic object may be the result of a classification, such as described with respect to step S10. However, it is also possible that a dedicated algorithm is used for determining the acoustic objects 30.

The hearing device 12 may monitor the soundscape regarding classes of relevant acoustic objects, e.g., voices, car sounds, bird singing, doorbell. For example, an acoustic object recognition system may be used to recognize acoustic objects.

In particular, the presence of one or more acoustic objects 30 may be detected with a machine learning algorithm into which the sound signal 20 is input and which has been trained to classify, whether a acoustic object 30 of a plurality of acoustic objects is present in the sound signal 20.

Such a machine learning algorithm may be seen as acoustic or acoustic object recognition algorithm, which may be created by training a trainable machine learning algorithm. The training data may be sound files, which represent different acoustic objects, e.g. voices, birds, doorbells, and music. Depending on the range of different sound files, the resulting algorithm may be capable of recognizing classes of acoustic objects. The result of the training may be a set of coefficients of the trainable machine learning algorithm, which may be an artificial neuronal net. The machine learning algorithm may be implemented with a software module, which represents the algorithm with the trained coefficients. Such a software module may be run in the hearing device 12 and/or the mobile device 26.

When the presence of at least one acoustic object 30 is detected, the method continues with step S16.

In step S16, at least one current perception magnitude value 32 for the current audio processing profile 28 is estimated. The current perception magnitude value 32 is indicative of a perception by the user of the acoustic object 30 in the processed sound signal 22. Furthermore, a corresponding reference perception magnitude value 32' for a reference audio processing profile 28' is estimated, which reference perception magnitude value 32' is indicative of a perception by the user of the acoustic object 30 in the acquired sound signal 20 or the acquired sound signal being processed with the reference audio processing profile 28'.

As one example, the reference audio processing profile 28' is a profile, in which the acquired sound signal 20 is not changed by the sound processor 16. As a further example, the reference audio processing profile 28' is the current audio processing profile 28, which one or some processing features removed, such as beamforming, noise cancelling, etc. For example, a frequency depended amplification or an overall amplification may be the same as in the current audio processing profile 28.

The current audio processing profile 28 may be seen as an aided hearing condition, while the reference audio processing profile 28' may be seen as an unaided hearing condition for the user. It has to be understood that unaided may also refer to less aided.

However, it is also possible that current audio processing profile 28 has less audio processing features as the reference audio processing profile 28' and the comparison is used to show the user that the reference audio processing profile 28' would have more benefits for him as the current audio processing profile 28.

At least one current perception magnitude value 32 and reference perception magnitude value 32' may be estimated by evaluating the sound signal 20 processed by the current audio processing profile 28 and/or the sound signal 20 processed with the reference audio processing profile 28'. The perception magnitude values 32, 32' also may be determined with a machine learning algorithm into which a respective sound signal 20, 22 is input.

In general, the current perception magnitude value 32 and reference perception magnitude value 32' may be determined such as described above, for example, by transforming the respective processed or unprocessed sound signal 20 into the frequency domain, devide the sound signal 20 into frequency bands, evaluate the frequency bands, etc. This also may be done by extracting one or more acoustic object signals from the respective sound signal 20 and performing the evaluating with the one or more acoustic object signals.

It may be that the sound signal 20 is also processed with the reference audio processing profile 28' but is not provided to the user, but is used to determine one or more reference perception magnitude values 32'.

For estimating the respective perception magnitude value 32, 32', features of the respective sound signal 20 are compared with features 36 of a hearing performance of the user. These features 36 may be stored in the hearing device 12 and/or the mobile device 26 and may have been collected during configuration of the hearing device. For example, the features 36 may be metrics on hearing abilities of the user. Such metrics may comprise sensitivity, captured by hearing threshold measure, discriminability, captured by a spectral and temporal resolution measure, localizability, captured by absolute or relative sound localization measure (acuity, minimal audible angle).

The features 36 also may comprise metrics on the listening effort of the user, such as an adaptive categorical listening effort scaling. For example, when speech is detected as a acoustic object 30, the perception prediction model may estimate a level of listening effort, which the user needs to understand the meaning of the recognized speech.

All these metrics may have been acquired with respect to aided current and unaided reference conditions, for example in a clinic.

In general, the perception magnitude values 32, 32' may be determined based on a perception prediction model (PPM) for estimating at least one of the following hearing performance attributes: detectability, recognizability, localizability and intelligibility. This may be done with respect to one, two or more of the detected acoustic objects 30.

The at least one current perception magnitude value 32 may comprise a current detectability value and the at least one reference perception magnitude value 32' may comprise a reference detectability value. Detectability may be defined as the probability of a acoustic object 30 being heard at all.

The detectability of a acoustic object 30 may be determined by comparing the spectral levels and/or values of a sound signal 20 with frequency specific hearing thresholds 36 of the user. This may be accomplished by measuring the input spectrum of the said sound as third octave levels dB free field. The measured unaided and the aided frequency specific hearing thresholds, e.g., with warble tones, of the user may be used as features 36. The measured unaided and the aided frequency specific hearing thresholds may be converted in sound pressure levels dB free field.

If at least in one frequency band the third octave level of the sound exceeds the respective threshold by 5 dB, the sound may be treated as audible. This decision may be performed for the current audio processing profile 28 and the reference audio processing profile 28'. If there is a different audibility between both cases, the situation may be suitable for experience of an audibility benefit.

The detectability of a acoustic object 30 also may be determined by calculating an overall loudness of the sound signal 20, 22. Aided and unaided loudness of the acoustic object 30 may be determined.

The detectability of a acoustic object 30 also may be determined by calculating spectral sensation levels above frequency specific hearing thresholds 36 of the user.

Sensation levels may be levels above individual hearing thresholds. A sensation index may be determined across frequencies.

As a further example, the at least one current perception magnitude value 32 comprises a current intelligibility value and the at least one reference perception magnitude value 32' comprises a reference intelligibility value. Intelligibility may be defined as the probability of understanding the meaning of the acoustic object 30, especially if it is speech.

For example, the intelligibility value of a sound signal 20, 22 may be determined by measuring the input spectrum of the sound signal 20, 22 and/or acoustic object 30 as third octave levels dB free field. The measured unaided and the aided frequency specific hearing thresholds of the user, which may be measured with warble tones, may be used as features 36 of the user. The measured unaided and the aided frequency specific hearing thresholds of the user may be converted in sound pressure levels dB free field.

As a further example, the intelligibility value of a sound signal 20, 22 may be determined by calculating a speech intelligibility index or a similar index of the sound signal 20, 22 and or a acoustic object 30, optionally corrected with a determined speech intelligibility threshold 36 of the user. The speech intelligibility index may be defined as the probability to understand a piece of speech.

The intelligibility value of a sound signal 20, 22 may be determined based on calculating a signal to noise ratio of the sound signal 20, 22. The hearing device 12 may estimate SNR levels, when speech is present as acoustic object 30.

A variant for intelligibility in noise my comprise: determining the speech intelligibility threshold (i.e. the speech recognition threshold SRT on the signal to noise ratio dimension) in noise for current audio processing profile 28 and the reference audio processing profile 28'.

It may be assumed that the hearing device has a benefit in noisy situations, if the SRT for the aided case is lower than the SRT for the unaided case. For instance, SRT unaided=8 dBSNR, aided=−2 dBSNR. That may mean that for noisy situations with SNRs around the SRTs, the hearing device 12 will increase SNR and by that intelligibility, e.g. with help of beamforming.

A further variant with SII and individual intelligibility measurement may be based on a measured intelligibility threshold for single syllable words in quiet, as feature 36. This may be performed for example with the so called "Freiburger Sprachtest", for the aided and unaided case.

Individual intelligibility does not only depend on acoustic situations, hearing loss (sensitivity loss as measured with the audiogram and other components as to selectivity loss, discriminability loss) and amplification settings but also on cognitive status. Memory and attention steering play a big role. An individual intelligibility measurement may take this into account.

As a further example, the at least one current perception magnitude value 32 comprises a current recognizability value and the at least one reference perception magnitude value 32' comprises a reference recognizability value. Recognizability may be defined as the probability of recognizing the object class of the acoustic object 30.

As a further example, the at least one current perception magnitude value 32 comprises a current localizability value and the at least one reference perception magnitude value 32' comprises a reference localizability value. Localizability may be defined as the probability of recognizing direction and distance of a sound source, such as a acoustic object 30.

In step S18, the user is notified, when a deviation 34 between the one or more current perception magnitude values 32 and the corresponding one or more reference perception magnitude values 32' exceeds a corresponding predefined threshold.

The hearing system 10 may continuously monitor the momentary difference between the current perception magnitude value 32 and the corresponding reference perception magnitude value 32' of the hearing performance attributes of the detected acoustic objects 30. The hearing system 10 may determine, if the momentary hearing situation is suitable for experiencing the benefit of the current audio processing profile 28. A strong experience of benefit may happen, when a strong difference in perceived detectability, recognizability, localizability and/or intelligibility of acoustic objects 30 is determined.

In general, the determination, whether a hearing situation has a benefit for the user may be based on two conditions. At first, the hearing situation should be sufficiently stable. A variation of the deviation 34 should be smaller as a stability threshold. At second, the benefit for the user should by sufficiently large: The deviation 34 should be higher as a benefit threshold. It has to be noted that the two thresholds may be chosen differently for different hearing situations, different soundscapes, different hearing losses, other aspects of the hearing situation and individual needs of the user.

Also, the benefit threshold for the deviation of the perception magnitude values 32, 32' may be adjustable by the user with the hearing system 10. The user may configure the benefit threshold to be either more often been informed about potential benefit experiences at the price that some of them provide only low degrees of benefit or to be only informed about a suitable situation if the benefit experience is high.

The variation of the deviation 34 may be determined via its temporal change. When a temporal change of the deviation 34 of the reference values 32, 32' is smaller than a temporal change threshold, the corresponding condition may be met. The temporal change threshold, and more general the stability threshold, may be adjustable by the user with the hearing system 10. The user may configure the stability threshold. A higher threshold may be selected, when the hearing situation needs to be more stable for comparing the sound generated with the current sound processing profile 28 and the reference sound processing profile 28'. A lower stability threshold may be selected, when it is acceptable that more fluctuations of the hearing situation make the comparison more difficult.

It is also possible that a difficulty value 38 of a current hearing situation is estimated by evaluating the acquired sound signal 20. In this case, the benefit threshold for the deviation of the perception magnitude values 32, 32' may be increased, when the difficulty value 38 increases. The difficulty value 38 may depend on the number and/or types of detected acoustic objects 30. When the hearing situation is difficult, i.e., detection, recognition, localization or understanding of a acoustic object 30 are difficult, for example due to many other acoustic objects 30 being present at the same time, then the benefit threshold may be set to a smaller level than for easy hearing situations. A small benefit in a demanding hearing situation may be valued more than the same amount of benefit in an easy hearing situation.

When the one or more conditions described above are fulfilled, the user may be notified about an opportunity to directly experience the hearing benefit of the hearing device 12 and its configuration in the current hearing situation.

The hearing system 10 and in particular the mobile device 26 may providing the user a user interface to switch to the reference audio processing profile 28', when the deviation exceeds the threshold. The user then may select to switch to the reference audio processing profile 28' to directly hear the difference to the current audio processing profile 28. It also may be that the hearing device 12 automatically switches to the reference audio processing profile 28, when the deviation exceeds the threshold.

If the user accepts the opportunity, the hearing system 10 offers to guide the user through a procedure which make to user listen alternately to the sound generated by the current sound processing profile 28 and the reference sound processing profile 28'. It is also possible that the user manually compares the sound processing profile 28, 28'.

With the method, the user is informed about hearing situations, when comparing directly the sound generated by the current sound processing profile 28 and the reference sound processing profile 28' allows to experience the benefit of aided hearing with a high probability. The user then also can compare directly the differently processed sound.

In a variant, the user may enter the perceived magnitude of benefit into the hearing system 10. This data may be stored and analyzed for improving the functioning of the hearing system 10.

In a further variant, the user allows a hearing care professional and/or the manufacturer to access the data of the perception magnitude values 32, 32', which may be recorded during performance of the method and/or the data entered by the user into the hearing system 10. The hearing care professional may see in this way, if the user's hearing situations are suitable for benefit experience and if the user is actively trying to have benefit experiences.

In a further variant, the perception magnitude values 32, 32' are displayed, for example on the mobile device 26. The user can see the perception magnitude values 32, 32' of the hearing performance for the acoustic objects 30, which are currently recognized. These data may be combined to a situation difficulty score. For orientation purposes, this score may be given for the sound processing profile 28, 28' and for an individual with healthy ears.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 hearing system
12 hearing device
14 sound input device, microphone
16 sound processor
18 sound output device, loudspeaker
20 acquired sound signal
22 processed sound signal
24 software processor
26 mobile device
28 current audio processing profile
28' reference audio processing profile
30 acoustic object
32 current perception magnitude value
32' reference perception magnitude value
34 deviation
36 features of hearing performance
38 difficulty value

The invention claimed is:

1. A method for informing a user of a hearing device about a current hearing benefit with the hearing device, the method being performed by a hearing system comprising the hearing device, which is worn by the user, and the method comprising:

acquiring a sound signal with a microphone of the hearing device, processing the acquired sound signal with the hearing device via a current audio processing profile and outputting the processed sound signal to the user;

detecting a presence of an acoustic object in the sound signal by classifying the sound signal;

when the presence of an acoustic object is detected, estimating at least one current perception magnitude value for the current audio processing profile and a corresponding reference perception magnitude value for a reference audio processing profile, wherein the current perception magnitude value and the reference perception magnitude value refer to a magnitude of at least one of detectability, recognizability, localizability and intelligibility of the acoustic object; and initiating an action, when a deviation between the current perception magnitude value and the reference perception magnitude value exceeds a corresponding predefined threshold.

2. The method of claim 1, further comprising:

notifying the user with a message, when a deviation between the current perception magnitude value and the reference perception magnitude value exceeds a corresponding predefined threshold; and/or providing a user interface to the user for switching to the reference audio processing profile, when the deviation exceeds the threshold; and/or switching to the reference audio processing profile, when the deviation exceeds the threshold.

3. The method of claim 1, wherein features of a hearing performance of the user for estimating the at least one current perception magnitude value and the reference perception magnitude value.

4. The method of claim 1, wherein the at least one current perception magnitude value and reference perception magnitude value are estimated by evaluating the sound signal processed by the current audio processing profile and/or the sound signal processed with the reference audio processing profile;

wherein for estimating the respective perception magnitude value, features of the respective sound signal are compared with features of a hearing performance of the user.

5. The method of claim 1, further comprising:

extracting one or more acoustic object signals from the respective sound signal and determining the at least one current perception magnitude value and reference perception magnitude value from the acoustic object signals.

6. The method of claim 1, wherein the at least one current perception magnitude value and reference perception magnitude value comprise a current detectability value and a reference detectability value;

wherein a detectability value of a sound signal is determined by at least one of:

comparing spectral values of the sound signal with frequency specific hearing thresholds of the user;

calculating an overall loudness of the sound signal;

calculating spectral sensation levels above frequency specific hearing thresholds of the user.

7. The method of claim 1, wherein the at least one current perception magnitude value and reference perception magnitude value comprise a current intelligibility value and a reference intelligibility value;

wherein an intelligibility value of a sound signal is determined by at least one of:

extracting a speech signal from the sound signal;

calculating a signal to noise ratio of the sound signal.

8. The method of claim 1, wherein the at least one current perception magnitude value and reference perception magnitude value comprise a current recognizability value and a reference recognizability value;

wherein a recognizability value of a sound signal depends on acoustic object signals extracted from the sound signal.

9. The method of claim 1, wherein the at least one current perception magnitude value and reference perception magnitude value comprises a current localizability value and a reference localizability value;

wherein a localizability value of a sound signal is determined by evaluating frequencies of the sound signals higher than a frequency threshold and/or an activity of beamformers of the hearing device.

10. The method of claim 1, further comprising:

estimating a difficulty value of a current hearing situation by evaluating the acquired sound signal;

wherein the threshold for the deviation of the perception magnitude values is increased, when the difficulty value increases;

wherein the difficulty value depends on the number and/or types of detected acoustic objects.

11. The method of claim 1, wherein the threshold for the deviation of the perception magnitude values is adjustable by the user with the hearing system.

12. The method of claim 1, further comprising:

solely when additionally a temporal change of the deviation of the reference values is smaller than a temporal change threshold, notifying the user;

wherein the temporal change threshold is adjustable by the user with the hearing system.

13. The method of claim 1, wherein the hearing system comprises a mobile device in data communication with the hearing device and the mobile device at least performs one of:

detecting the presence of the acoustic object;

estimating the at least one current perception magnitude value and reference perception magnitude value;

notifying the user.

14. A non-transitory computer-readable medium having instructions stored thereon that, when executed by at least one processor of a hearing system comprising a hearing device, causes the processor to carry out the steps of the method of claim 1 for informing a user of the hearing device about a current hearing benefit.

15. A hearing system comprising:

a hearing device, wherein the hearing system is adapted for performing the method of claim 1.

* * * * *